(12) United States Patent
Miyagawa et al.

(10) Patent No.: US 9,895,861 B2
(45) Date of Patent: Feb. 20, 2018

(54) UNIDIRECTIONALLY STRETCHABLE SUBSTRATE, STRETCHABLE COMPOSITE SHEET, AND METHOD OF MANUFACTURING THE SAME

(75) Inventors: Atsushi Miyagawa, Tokyo (JP); Hideo Kumehara, Tokyo (JP); Shigehisa Nakazawa, Tokyo (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 680 days.

(21) Appl. No.: 13/699,893

(22) PCT Filed: Mar. 18, 2011

(86) PCT No.: PCT/JP2011/056558
§ 371 (c)(1),
(2), (4) Date: Nov. 26, 2012

(87) PCT Pub. No.: WO2011/148703
PCT Pub. Date: Dec. 1, 2011

(65) Prior Publication Data
US 2013/0065014 A1 Mar. 14, 2013

(30) Foreign Application Priority Data
May 26, 2010 (JP) ................................ 2010-120400

(51) Int. Cl.
*B32B 5/12* (2006.01)
*D04H 3/04* (2012.01)
(Continued)

(52) U.S. Cl.
CPC ............... *B32B 5/12* (2013.01); *B32B 37/06* (2013.01); *D01D 5/088* (2013.01); *D01D 5/0985* (2013.01);
(Continued)

(58) Field of Classification Search
CPC .......... D04H 3/011; D04H 3/04; D04H 3/045; D04H 3/005; D04H 3/033; D04H 5/06;
(Continued)

(56) References Cited

U.S. PATENT DOCUMENTS

| 5,334,446 A | * | 8/1994 | Quantrille et al. ............. 442/35 |
| 5,993,943 A | * | 11/1999 | Bodaghi ............... D01D 5/0985 |
| | | | 428/198 |
| 2003/0003833 A1 | | 1/2003 | Kurihara et al. |

FOREIGN PATENT DOCUMENTS

| JP | 2000-080553 A | 3/2000 |
| JP | 2000-301635 A | 10/2000 |

(Continued)

OTHER PUBLICATIONS

Office Action dated Apr. 15, 2014 in corresponding JP application No. 2010-120400.
(Continued)

*Primary Examiner* — Jennifer A Steele
(74) *Attorney, Agent, or Firm* — Knobbe, Martens, Olson & Bear, LLP

(57) ABSTRACT

A unidirectionally stretchable substrate which has good shape retaining characteristics and whose weight can be easily reduced is provided. Unidirectionally 1 stretchable substrate has meshed material 2 that has a plurality of elastomeric linear members 3 arranged orthogonal to each other, the linear members having stretchability and thermoplasticity; and non-woven fabric 4 that is formed of a plurality of filaments 5, the filaments being made of a thermoplastic resin. Filaments 5 of non-woven fabric 4 have been drafted in one direction and are linearly arranged only in that direction. Non-woven fabric 4 is bonded to meshed material 2 such that direction y in which filaments 5 of the non-woven fabric 4 are arranged is parallel with one of (Continued)

directions y in which linear members 3 of meshed material 2 extend.

7 Claims, 3 Drawing Sheets

(51) Int. Cl.
*D01D 5/088* (2006.01)
*D04H 3/05* (2006.01)
*D01D 5/098* (2006.01)
*B32B 37/06* (2006.01)
*D04H 3/011* (2012.01)

(52) U.S. Cl.
CPC ............... *D04H 3/011* (2013.01); *D04H 3/04* (2013.01); *D04H 3/05* (2013.01); *Y10T 428/24124* (2015.01)

(58) Field of Classification Search
CPC .......... B32B 2250/20; B32B 2260/023; B32B 2260/046; B32B 2262/0207; B32B 2307/51; B32B 5/26; B32B 5/04; B32B 37/06; B32B 5/12; B32B 5/10; B32B 5/026; B32B 5/022; Y10T 442/601; Y10T 442/659; Y10T 442/68; Y10T 442/3008; Y10T 442/3358; Y10T 442/121; Y10T 442/10; Y10T 442/102; B32G 5/022
USPC ........ 442/1, 13, 51, 184, 182, 269; 428/105, 428/114
See application file for complete search history.

(56) References Cited

FOREIGN PATENT DOCUMENTS

| | | | | |
|---|---|---|---|---|
| JP | 2001-003252 | * | 1/2001 | ............... D04H 1/54 |
| JP | 2001-003252 | A | 1/2001 | |
| JP | 2002-155460 | B2 | 5/2002 | |
| JP | 2004-009510 | A | 1/2004 | |
| JP | 2006-104611 | A | 4/2006 | |
| JP | 3816269 | B2 | 6/2006 | |
| JP | 4180598 | B2 | 9/2008 | |
| WO | 95/03171 | A1 | 2/1995 | |

OTHER PUBLICATIONS

Extended European Search Report dated Oct. 4, 2013 in corresponding European patent application No. 11786403.3.

* cited by examiner

UNIDIRECTIONALLY STRETCHABLE SUBSTRATE, STRETCHABLE COMPOSITE SHEET, AND METHOD OF MANUFACTURING THE SAME

CROSS-REFERENCE TO RELATED APPLICATIONS

This application is the U.S. National Phase under 35. U.S.C. § 371 of International Application PCT/JP2011/056558, filed Mar. 18, 2011, which claims priority to Japanese Patent Application No. 2010-120400, filed May 26, 2010. The disclosures of the above-described applications are hereby incorporated by reference in their entirety. The International Application was published under PCT Article 21(2) in a language other than English.

TECHNICAL FIELD

The present invention relates to a unidirectionally stretchable substrate, a stretchable composite sheet and a method of manufacturing the same, particularly to a unidirectionally stretchable substrate which is a composite of an elastomeric meshed material and a non-woven fabric.

BACKGROUND ART

Stretchable substrates that have an elastomeric net and a non-woven fabric bonded thereto are known (Patent Documents 1, 2). Patent Document 1 discloses a technique for manufacturing a stretchable substrate by laminating a stretchable meshed material, which consists of continuous linear members made of styrene-based elastomer, on one of the surfaces of a non-woven fabric. Patent Document 2 discloses a technique for manufacturing a stretchable substrate by laminating a non-woven fabric, which is made of staples and which have been subjected to carding, on one or both sides of an elastomeric net and by intertwining the net and the fabric by means of water jet (high pressure liquid flow treatment).

However, the non-woven fabric in the stretchable substrate fabricated by these techniques is stretchable in any direction because the fibers forming the non-woven fabric are curved and randomly oriented. As a result, the stretchable substrate having the non-woven fabric and an elastic meshed material (a net) laminated thereon is also stretchable in any direction.

On the other hand, stretchable substrates may be required to be stretchable only in one direction with limited stretchability in the orthogonal direction for use in specific applications, such as the substrate of masks and supporters etc. Furthermore, when a stretchable substrate is bonded to another material while they are fed from individual feed rolls in order to manufacture a final product, large stretchability of the stretchable substrate may limit the feed speed of the feed rolls. Therefore, there is also a need of limiting the stretchability for the purpose of increasing the feed speed and improving production efficiency.

Under such circumstances, a technique has been developed in which lateral strands of a net are formed of stretchable elastomer while longitudinal strands thereof are formed of a non-elastomeric material having limited stretchability. Such a net exhibits conventional stretchability in the direction along the lateral strands and limited stretchability in the direction along the longitudinal strands. One of the examples is "REBOUND", a net manufactured by CONWED PLASTICS, LLC, USA (Patent Document 3). This net has lateral strands formed of styrene-based block copolymer and longitudinal strands formed of polypropylene (PP), and intersections of the lateral and longitudinal strands are thermally fused.

PRIOR ART LIST

Patent Document

Patent Document 1: JP2006-104611A
Patent Document 2: JP2000-301635A
Patent Document 3: JP4180598B (pars. 0045, 0046)

SUMMARY OF INVENTION

Technical Problem to be Solved

When a material having small stretchability is used for the longitudinal strands in fabrication of a net, as described in Patent Document 3, olefin materials such as high-density polypropylene (HDPE) and ethylene-vinyl acetate copolymer (EVA), in addition to polypropylene (PP), may be used for the longitudinal strands. However, there is a problem of poor thermal fusion bonding strength of the intersections when styrene-based elastomer and an olefin material are used for the lateral and longitudinal strands, respectively, and integrated into a net. Therefore, the lateral and longitudinal strands may easily be separated when the net is laminated on another material and heated, for example, in manufacturing of a final product in which the net is used as a substrate. To prevent the separation between the lateral and the longitudinal strands and to enhance shape retaining characteristics, it is effective to increase the density (supply rate per unit time) of the lateral and the longitudinal strands to thus increase the number of intersections. However, an increase in the density of the lateral and longitudinal strands results in an increase in the amount of material to be used, which leads to difficulty in reducing weight and thereby affects cost. Further, an increase in the density of the lateral and longitudinal strands results in deterioration of air permeability, lateral stretchability and flexibility of the longitudinal strands.

It is an object of the present invention to provide a unidirectionally stretchable substrate which has good shape retaining characteristics and whose weight can be easily reduced, a stretchable composite sheet using the same and a manufacturing method therefor.

Solution to Solve the Problem

A unidirectionally stretchable substrate of the present invention comprises; a meshed material that comprises a plurality of elastomeric linear members arranged orthogonal to each other, the linear members having stretchability and thermoplasticity; and a non-woven fabric that is formed of a plurality of filaments, the filaments being made of a thermoplastic resin. The filaments of the non-woven fabric have been drafted in one direction and are linearly arranged only in that direction. The non-woven fabric is bonded to the meshed material such that a direction in which the filaments of the non-woven fabric are arranged is parallel with one of directions in which the linear members of the meshed material extend.

In the non-woven fabric of the present invention, the filaments have been drafted in one direction and are linearly arranged only in that direction. The stretchability of such a non-woven fabric is limited only in the above-mentioned one direction. The non-woven fabric is bonded to the meshed material such that a direction in which the filaments of the non-woven fabric are arranged parallel with one of directions in which the linear members of the meshed material extend. As a result, the stretchability of the meshed material is efficiently limited only in the direction in which the filaments are arranged and is hardly affected in the direction orthogonal thereto.

Since no limitations are placed on the material that constitutes the linear members as long as the elastomer material has stretchability and thermoplasticity, the bonding between the longitudinal and lateral linear members can be easily strengthened. As a result, the separation is less likely to occur at the intersections and the shape retaining characteristics is improved. The meshed material is bonded to the non-woven fabric in a large contact area and further reinforced by the non-woven fabric. Therefore, the shape retaining characteristics is further improved. In addition, the filaments of the above-mentioned woven fabric that are linearly arranged only in one direction realize almost no stretchability in that direction even with a small amount of the non-woven fabric and minimize a weight increase in the unidirectional stretchable substrate.

A stretchable composite sheet of the present invention includes the above-described unidirectionally stretchable substrate and a fabric laminated on at least one surface of the unidirectionally stretchable substrate.

A method of manufacturing a unidirectionally stretchable substrate of the present invention includes the step of bonding a meshed material to a non-woven fabric, wherein the meshed material comprises a plurality of elastomeric linear members arranged orthogonal to each other, the linear members having stretchability and thermoplasticity, and wherein the non-woven fabric is formed of a plurality of filaments, the filaments being made of a thermoplastic resin. The filaments of the non-woven fabric have been drafted in one direction and are linearly arranged only in that direction. The step of bonding includes bonding the non-woven fabric to the meshed material such that a direction in which the filaments of the non-woven fabric are arranged is parallel with one of the directions in which the linear members of the meshed material extend.

A method of manufacturing a stretchable composite sheet of the present invention includes laminating a fabric on the unidirectionally stretchable substrate that is manufactured according to the above-described method while the fabric and the substrate are fed from individual feed rolls such that a direction in which the fabric and the substrate are fed corresponds to a direction in which the filaments of the unidirectionally stretchable substrate are arranged.

Effects of Invention

According to the present invention, it is possible to provide a unidirectionally stretchable substrate which has good shape retaining characteristics and whose weight can be easily reduced, a stretchable composite sheet using the same and a manufacturing method therefor.

DESCRIPTIONS OF REFERENCE NUMERALS

1 Unidirectionally stretchable substrate
2 Meshed material (Net)
3 Linear member
4 Non-woven fabric
5 Filament
10-10" Stretchable composite sheet
11-14 Fabric
15, 16 Feed roll

DESCRIPTION OF EMBODIMENTS

Hereafter, a unidirectionally stretchable substrate of the present invention and a stretchable composite sheet using the same will be described with reference to the drawings.

Figure 1A:
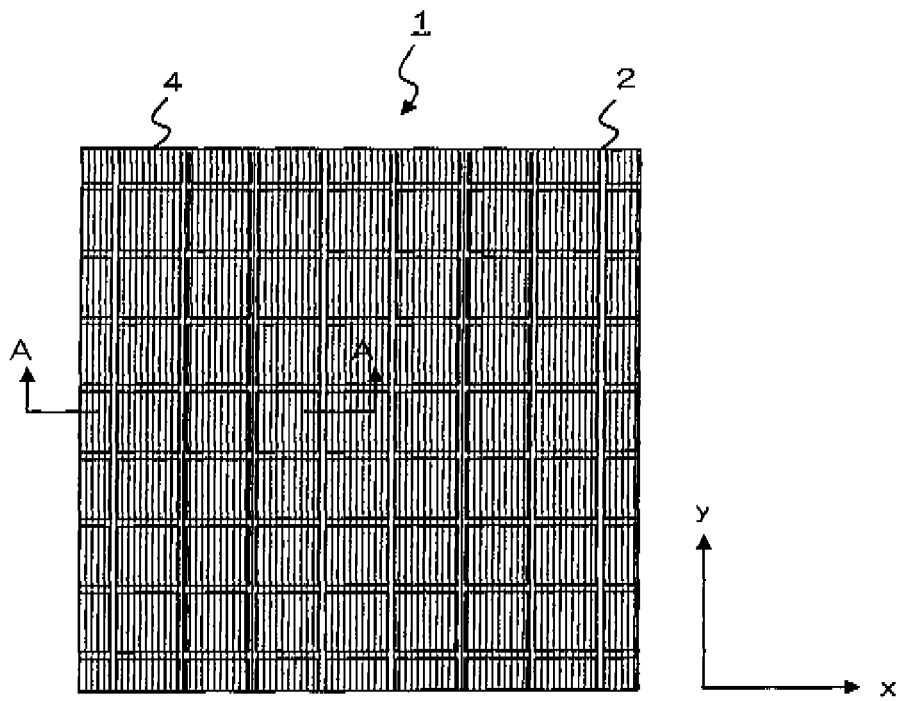
FIG. 1A is a plan view of a unidirectionally stretchable substrate of the present invention.
Figure 1B:
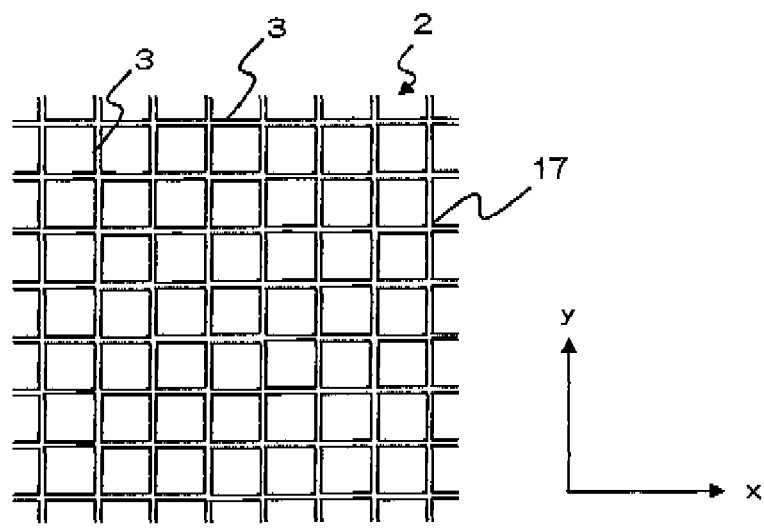
FIG. 1B is a plan view only showing the meshed material of the unidirectionally stretchable substrate of the present invention.
Figure 1C:
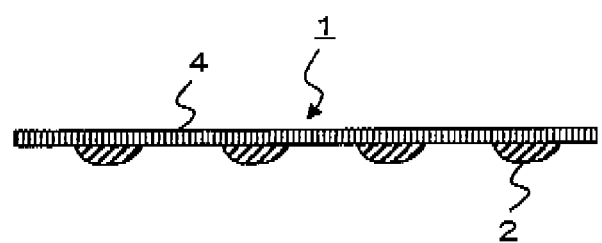
FIG. 1C is a cross-sectional view of a unidirectionally stretchable substrate of the present invention.

FIGS. 1A to 1C are plan views and a cross-sectional view of a unidirectionally stretchable substrate of the present invention. FIG. 1A is a plan view of a unidirectionally stretchable substrate. FIG. 1B is a plan view only showing the meshed material. FIG. 1C is a cross-sectional view taken along the line A-A of FIG. 1A.

Unidirectionally stretchable substrate 1 is formed by the bonding of meshed material 2 and non-woven fabric 4, made of a thermoplastic resin, by means of thermal compression (or thermal fusion).

Meshed material 2 is formed of a plurality of linear members 3 that are arranged orthogonal to each other, as shown in FIG. 1B. Linear members 3 are arranged in directions x and y in FIG. 1B. Each linear member 3 is formed of a thermoplastic elastomeric material which has both stretchability and thermoplasticity and which is softened with heat at a predetermined temperature. Meshed material 2 may be formed of a styrene-based elastomer, a urethane-based elastomer, and the like. Examples of styrene-based elastomer include a styrene-ethylene-butylene-styrene copolymer (SEBS), a styrene-ethylene-propylene-styrene copolymer (SEPS), a styrene-isoprene-styrene copolymer (SIS) and a styrene-butylene-styrene copolymer (SBS). Examples of urethane-based elastomer include polyester, low molecular glycol, methylene bis-phenylisocyanate or ortho-tolidine diisocyanate.

Figure 2:
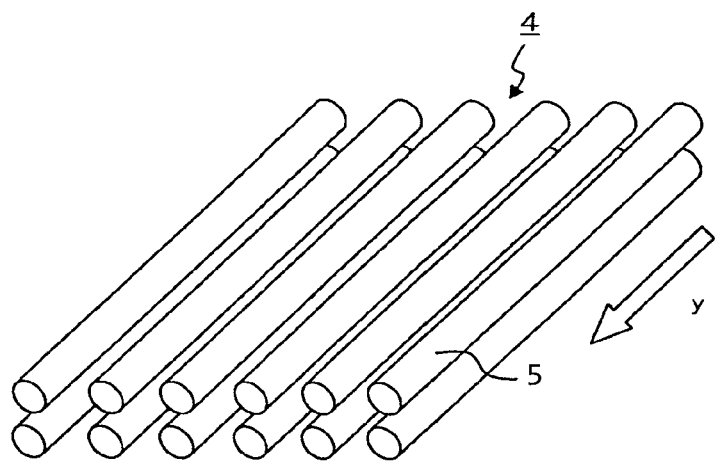
FIG. 2 is a partial perspective view of a non-woven fabric used for the unidirectionally stretchable substrate shown in FIG. 1.

FIG. 2 is a schematic partial perspective view of a non-woven fabric in which a part of the non-woven fabric is enlarged. Non-woven fabric 4 is formed of a plurality of filaments 5 that are made of a thermoplastic resin. Non-woven fabric 4 is heat-resistive at the temperature of thermal compression. Filaments 5 are linearly arranged only in one direction y. The term "one direction" includes, in terms of filaments 5, not only parallel with each other but also substantially in the same direction although not parallel with each other. The term "linearly" includes, in terms of each fiber, not only completely linear but also partially or generally curved. Filaments 5 illustrated in FIG. 2 are laminated in two layers, but may be arranged in one layer or laminated in more than two layers. Actual non-woven fabric 4 has more complex configurations; filaments 5 are intertwined with each other; filaments 5 are not linearly arranged in the exact sense; and some of them are oriented in directions other than direction y. However, non-woven fabric 4 is conceptually configured as described above.

Filaments 5 of non-woven fabric 4 have been drafted in one direction, i.e., in direction y in FIGS. 1A to 1C, and 2. The drafting direction y coincides with direction y in which filaments 5 are arranged. Non-woven fabric 4 is bonded to meshed material 2 by means of thermal compression such that direction y in which filaments 5 of non-woven fabric 4 are arranged is parallel with one of the directions along which linear members 3 of meshed material 2 extend (which is direction y in the present embodiment, but may be direction x). Linear members 3 and intersections 17 of linear members 3 are preferably crushed at the time of thermal compression. The term "parallel" includes not only completely parallel but also substantially parallel.

Filament 5 of non-woven fabric 4 may be formed of thermoplastic resins, such as nylon, polyester, and the like. In particular, polyethylene terephthalate (PET) may be preferably used. Ultraviolet ray inhibitors, anti-oxidation-degradation agents, flame retarders, and the like may be added to the thermoplastic resin as an additive depending on the use of the non-woven fabric. The diameter of each filament 5 is preferably in a range of 1 to 20 μm and about 10 μm in one embodiment.

Non-woven fabric 4 may also be bonded to meshed material 2 by suitable methods other than the thermal compression. For example, ultrasonic bonding may be used to bond non-woven fabric 4 to meshed material 2. An extrusion lamination method may also be used to form resin stripes extending in the resin flow direction (longitudinal direction). The resin is formed such that portions with resin and portions without resin occur at intervals of, for example, 2 cm, instead of being formed all over the entire surface. Stretchability in the lateral direction is maintained in this method because of the portions without resin that do not contribute to bonding.

Non-woven fabric 4 may also be selected from commercially available products. Examples of such non-woven fabric includes "MILIFE (Registered trademark)" Grade T05 (weight per area 5 g/m$^2$), Grade T10 (weight per area 10 g/m$^2$), Grade T15 (weight per area 15 g/m$^2$) and Grade T20 (weight per area 20 g/m$^2$), which are manufactured and sold by the present applicant (or the assignee). In particular, Grade T5 may be preferably used because of the small weight per area and satisfactory unidirectional stretchability.

Meshed material 2, which is formed of elastomer, has inherent and large stretchability both in direction x and direction y (and in any direction between directions x and y, as well). Non-woven fabric 4 exhibits large resistance against a tensile force with limited stretchability in direction y because it has been drafted in direction y and filaments 5 are linearly arranged in direction y. On the other hand, non-woven fabric 4 freely deforms in response to a tensile force in direction x without exhibiting substantial resistance. Therefore, unidirectionally stretchable substrate 1 formed by bonding non-woven fabric 4 with meshed material 2 exhibits large resistance and limited stretchability against a tensile force in direction y, while it can be stretched and contracted in response to a tensile force in direction x substantially with inherent stretchability of meshed material 2. In this manner, a substrate which has stretchability only in one direction can be realized.

Figure 3:
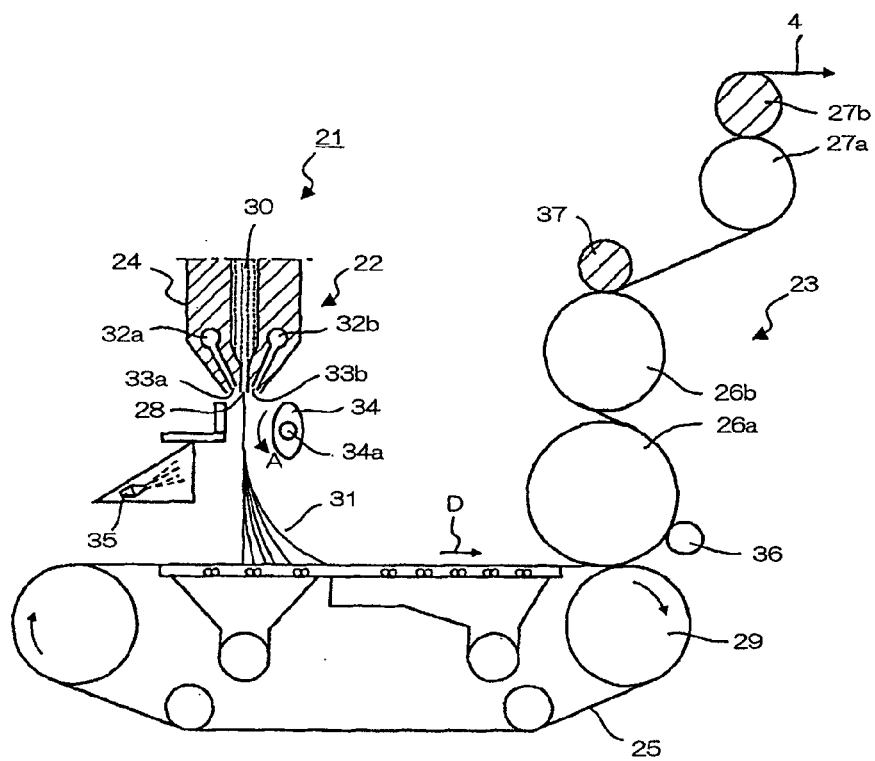
FIG. 3 is a schematic view showing a method of manufacturing the non-woven fabric shown in FIG. 1.

Non-woven fabric 4 may be manufactured based on the following steps. FIG. 3 shows a schematic diagram of a manufacturing apparatus used for the fabrication of non-woven fabric 4. No-woven fabric manufacturing apparatus 21 includes spinning unit 22 and drafting unit 23. Spinning unit 22 mainly consists of melt blown die 24 and conveyor 25, and drafting unit 23 consists of drafting cylinders 26a, 26b, take-up nip rolls 27a, 27b, and so on. Melt blown die 24 is provided, at the tip end thereof (lower end), with a large number of nozzles 28 that are arranged in the direction perpendicular to the drawing (only one of them is shown in the figure). Molten resin 30, fed from a gear pump (not shown), is extruded from nozzles 28 so that a large number of filaments 31 are formed. Air reservoirs 32a, 32b are provided on both sides of each nozzle 28, respectively. High pressure heated air which is heated at or above the melting point of the resin is fed into air reservoirs 32a, 32b and is ejected through slits 33a, 33b, which are connected to air reservoirs 32a, 32b and which are open at the tip end of melt blown die 24. As a result, a high velocity gas flow is generated substantially parallel with the direction in which filaments 31 are extruded from nozzles 28. Filaments 31 which are extruded from nozzles 28 are maintained in a stretchable and molten state by the high velocity gas flow. Filaments 31 are subjected to stretching by the friction force of the high velocity gas flow so that filaments 31 are reduced in diameter. The temperature of the high velocity gas flow is set higher than the spinning temperature of filaments 31 by 80° C. or more, preferably by 120° C. or more. The method of forming filaments 31 by means of melt blown die 24 makes the molecular orientation of filaments 31 more unidirectional. This is because the temperature of filaments 31 immediately after filaments 31 are extruded from nozzles 28 can be set sufficiently higher than the melting point of filaments 31 by increasing the temperature of the high velocity gas flow. In case of fabricating continuous filaments of polyethylene terephthalate resin, the diameter of the filaments can be reduced to 10 to 23 μm by the heated air during the melt extrusion process.

Conveyor 25 is disposed below melt blown die 24. Conveyor 25 is wound about conveyor rolls 29 which are rotated by driving means (not shown) and wound about other rolls. Filaments 31 that are extruded from nozzles 28 are transported rightwards in the figure (transport direction D) by conveyor 25 that is driven by the rotation of conveyor roll 29.

Filaments 31 flow along a high velocity gas flow which is made by merging of the high pressure heated air flows ejected from slits 33a, 33b on both sides of nozzle 28. The high velocity gas flow, which is made by merging of the high pressure heated air flows ejected from slits 33a, 33b, flows in a direction substantially perpendicular to the transport plane of conveyor 25.

Spray nozzle 35 is provided between melt blown die 24 and conveyor 25. Spray nozzle 35 sprays water into the high velocity gas flow so that filaments 31 are cooled and rapidly solidified. More than one spray nozzle 35 is actually provided, but only one of them is shown in the figure. The fluid that is ejected from spray nozzle 35 may not necessarily include water or the like as long as it can cool filaments 31. The fluid may be cooled air.

Gas flow oscillating mechanism 34 in the form of an elliptic column is provided in the vicinity of melt blown die 24 where the high velocity gas flow generated by slits 33a, 33*b* is present. Gas flow oscillating mechanism 34 is rotated in arrow direction A about axis 34*a*, which is approximately perpendicular to transport direction D of filaments 31 on conveyor 24, i.e., approximately parallel with the width direction of non-woven fabric 4 to be manufactured. In general, when a wall exists in the vicinity of a high velocity jet flow of gas or liquid, the jet flow tends to flow near and along the wall surface. This is called the Coanda effect. Gas flow oscillating mechanism 34 utilizes the Coanda effect in order to change the flow direction of filaments 31. In the case illustrated, when the line of apsides of the ellipse of gas flow oscillating mechanism 34 corresponds to the direction of the high velocity gas flow (the up-and-down direction in the figure), filaments 31 fall substantially vertically toward conveyor 25. When gas flow oscillating mechanism 34 rotates about axis 34*a* by 90 degrees so that the line of apsides of the ellipse of gas flow oscillating mechanism 34 is perpendicular to the direction of the high velocity gas flow, filaments 31 are biased in transport direction D of conveyor 25 (rightwards in the figure), reaching the maximum amount of bias at this time. As gas flow oscillating mechanism 34 further rotates about axis 34*a*, the position on conveyor 25, where filaments 31 fall, periodically moves backwards and forwards with respect to transport direction D. Thus, solidified filaments 31 are accumulated on conveyor 25 while they are swayed in the longitudinal direction (in transport direction D and in the opposite direction). Solidified filaments 31 are then continuously collected while they are partially folded in the longitudinal direction so that continuous filaments 31 are formed.

Filaments 31 collected on conveyor 25 are transported in transport direction D by means of conveyor 25 and then nipped by drafting cylinder 26*a* and press roll 36 which are heated at the temperature for drafting. Thereafter, filaments 31 are brought into close contact with two drafting cylinders 26*a*, 26*b* while being nipped by drafting cylinder 26*b* and rubber press roll 37. In this manner, filaments 31 are transported in close contact with drafting cylinders 26*a*, 26*b* so that filaments 31 become a web in which adjacent filaments 31 are fused to each other while being partially folded in the longitudinal direction. Two drafting cylinders 26*a*, 26*b* are preferably arranged as close to each other as possible. This is called short distance drafting. Since filaments 31 may be folded halfway or curved a little, the distance between the starting point and the ending point of the drafting is preferably as small as possible in order to effectively draft individual filaments 31.

The web which is formed by being transported in close contact with drafting cylinders 26*a*, 26*b* is then received by take-up nip rolls 27*a*, 27*b* (downstream take-up nip roller 27*b* is made of rubber). Take-up nip rolls 27*a*, 27*b* have larger circumferential velocities than drafting cylinders 26*a*, 26*b*. As a result, the web is drafted in the longitudinal direction and becomes non-woven fabric 4. The filaments can be more unidirectionally oriented by drafting the spun web in the longitudinal direction in this manner. In case of fabricating continuous filaments of polyethylene terephthalate resin, the filaments are drafted 3 to 10 times longer so that the diameters of the filaments are reduced to 1 to 20 µm. Such a drafting operation allows the filaments to be more unidirectionally arranged. Filaments 31 that become long with a limited drafting stress can be formed by cooling filaments 31 in a sufficiently rapid manner. This is realized by spraying water by spray nozzle 35 in order to add mist to the high velocity gas flow, as described above. In non-woven fabric 4 formed by the above described method, continuous filaments 5 are linearly arranged in one direction.

Non-woven fabric 4, manufactured as described above, is bonded to meshed material 2 (for example, by means of thermal compression) such that direction y in which filaments 5 of non-woven fabric 4 are arranged is parallel with direction y in which linear members 3 of meshed material 2 extend. Unidirectionally stretchable substrate 1 described above can be thus manufactured.

Figure 4A:
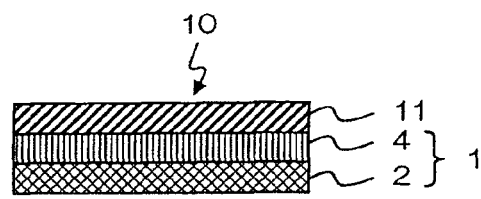
FIG. 4A is a cross-sectional view showing a stretchable composite sheet according to an embodiment.
Figure 4B:
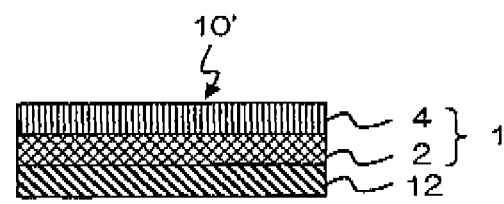
FIG. 4B is a cross-sectional view showing a stretchable composite sheet according to an embodiment.
Figure 4C:
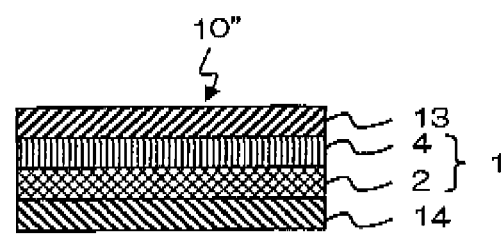
FIG. 4C is a cross-sectional view showing a stretchable composite sheet according to an embodiment.

Unidirectionally stretchable substrate 1 descried above may be used as materials for various final products. FIGS. 4A to 4C show the cross sections of stretchable composite sheets 10 to 10" in which unidirectionally stretchable substrate is bonded to fabrics 11 to 14 at least on one surface of unidirectionally stretchable substrate. FIG. 4A is an example (stretchable composite sheet 10) in which fabric 11 is bonded on the side of non-woven fabric 4. FIG. 4B is an example (stretchable composite sheet 10') in which fabric 12 is bonded on the side of meshed material 2. FIG. 4C is an example (stretchable composite sheet 10") in which fabric 13 is bonded on the side of non-woven fabric 4 and fabric 14 is bonded on the side of meshed material 2. Fabrics 11 to 14 refer to the large number of fibers that are processed to take on the shape of a thin plate. The structure and material of fabrics 11 to 14 are not particularly limited and may be selected, as needed, depending on what they are used for. Webs made of staples may be preferably used as the material of fabrics 11 to 14, but any one of non-woven fabrics, synthetic fibers, natural fibers and regenerated fibers may also be selected as long as they can be laminated on or bonded to unidirectionally stretchable substrate 1. The lamination process is not limited to the thermal compression. Methods which utilize high pressure water flow to cause intertwining of fibers may also be used.

Stretchable composite sheets 10 to 10" may be applied, for example, to wipers, side gathers of disposable diaper, sanitary products, wrist bands, bandages, masks, supporters, substrates for cataplasm, and the like.

Figure 5:
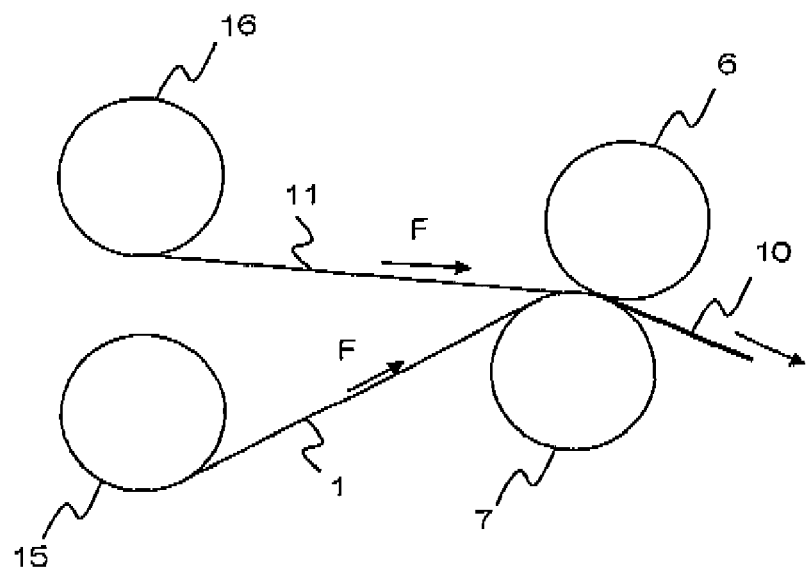
FIG. 5 is a schematic view showing a method of manufacturing a stretchable composite sheet.

FIG. 5 is an exemplary schematic diagram showing a method of manufacturing stretchable composite sheet 10 shown in FIG. 4A. Unidirectionally stretchable substrate 1 and fabric 11 are separately supplied from feed rolls 15, 16 and are continuously fed in between a pair of press rolls 6, 7 (thermal compressing means). Unidirectionally stretchable substrate 1 and fabric 11 which are fed to press rolls 6, 7 are compressed and heated by press rolls 6, 7 to be thermally compressed. Styrene-based elastomers and urethane-based elastomers are typically melted with heat at 100 to 200° C. Therefore, the heating temperature at the press rolls is preferably set at about 100 to 200° C.

Unidirectionally stretchable substrate 1 is preferably supplied from feed roll 15 such that direction y in which filaments 5 of unidirectionally stretchable substrate 1 are arranged corresponds to feeding direction F. To describe the reason, suppose first that meshed material 2 that is not bonded to non-woven fabric 4, instead of unidirectionally stretchable substrate 1 of the present invention, is supplied alone from feed roll 15. Since meshed material 2 has large stretchability in feeding direction F, meshed material 2 is repeatedly stretched and contracted by the tensions that are applied to meshed material 2 when it is fed. Therefore, the feed speed may temporarily decrease and then recover for some reason, for example, because a portion of meshed material 2 that is wound around feed roll 15 may be engaged with another portion of meshed material 2 that is wound on feed roll 15 when the former is about to leave feed roll 15. Such fluctuation of the feed speed causes meshed material 2 itself to be repeatedly stretched and contracted, preventing stable supply of meshed material 2 to press rolls 6, 7. This may further cause problems, such as damage on meshed material 2 due to an unpredictable tensile force and partial overlapping of meshed material 2. This can be prevented most certainly by limiting the feed speed, and therefore the feed speed is normally limited to about several meters per minute. However, limiting the feed speed directly decreases production efficiency.

In contrast, it is difficult for unidirectionally stretchable substrate 1 of the present invention to become deformed because of the limited stretchability in one direction. By setting direction y, in which stretchability is limited, parallel with supplying direction F, the stretching and contracting deformation in supplying direction F can be prevented due to the inherent rigidity of the unidirectionally stretchable substrate even if the above-mentioned phenomenon occurs. For this reason, stable supply of unidirectionally stretchable substrate 1 is realized at a high feed speed. A feed speed of about several tens of meters per minute is available according to the present invention.

A large feed speed can be obtained in any manufacturing process for any product as long as the process includes the step of supplying unidirectionally stretchable substrate 1 by means of a feed roll. For example, when the high pressure water flow described above is used, a method similar to the so-called spunlace method may be used to manufacture stretchable composite sheet 10. In this method, a non-woven web made of staples is fabricated first by a carding machine. Then, a high pressure water flow is used to make the non-woven web made of staples impact against meshed material 2 of unidirectionally stretchable substrate 1 which is supplied from a feed roll. The staples are intertwined with linear members 3 of meshed material 2 and laminated on the surface of meshed material 2. Thus, a non-woven fabric that resembles a spunlace non-woven fabric can be formed on unidirectionally stretchable substrate 1. If meshed material 2 was supplied alone in this manufacturing method, the above-described problem would arise again and the feed speed would have to be limited. According to the present invention, it is possible to feed unidirectionally stretchable substrate 1 at a one digit larger feed speed than prior art and thereby to significantly improve production efficiency.

Depending on applications, linear members 3, as well as intersections 17 of linear members 3, are preferably crushed during the thermal compression. This step may be performed when meshed material 2 is thermally compressed to non-woven fabric 4 in order to manufacture unidirectionally stretchable substrate 1 or when stretchable composite sheet 10 is manufactured. Since meshed material 2 is formed of elastomeric linear members 3 that are arranged longitudinally and laterally, the unevenness of meshed material 2 gives an inherent stimulus to a human body when it comes into contact with the human body. In particular, the intersections of linear members 3 tend to give a large stimulus because they may protrude relative to the surroundings. In applying stretchable composite sheet 10 to hygienic uses, such as masks and bandages, the unevenness of the meshed material causes an unfavorable rough touch to the skin. Removing the unevenness in advance mitigates the stimulus caused by the unevenness and provides better wearing comfortableness, as well as good applicability to hygienic uses.

The advantages of the present invention are summarized below.

First, since the unidirectionally stretchable substrate of the present invention uses filaments which have been drafted in one direction and are linearly arranged only in that direction, limited stretchability in a specific direction can be realized with a minimum amount of material. As a result, an increase in the weight per area of the unidirectionally stretchable substrate can be minimized.

In one example, the above described "REBOUND" (model number: X30014) manufactured by CONWED PLASTICS, LLC was laminated on the above described "MILIFE" (model number: T5) in order to fabricate a unidirectionally stretchable substrate. "REBOUND" has elastomeric linear members both in the longitudinal and lateral directions with a mesh size of 3 mm×6 mm and a weight per area of 44 g/m². On the other hand, the unidirectionally stretchable substrate of the present invention has the same mesh size and a weight per area of 49 g/m². According to a preferred embodiment of the present invention, the weight per area of the non-woven fabric can be limited to below or equal to 10 g/m², and the weight per area of the meshed material can be limited to below or equal to 50 g/m². The reason why a unidirectionally stretchable substrate having such low weight per area can be realized is that an increase in weight per area is minimized due to the use of a non-woven fabric in which filaments have been drafted in one direction and are linearly arranged in that direction. In particular, it is easy to reduce the weight of PET filaments because of high strength in the longitudinal direction and the PET filaments are also effective for preventing any deterioration in the flexibility of the stretchable substrate.

The meshed material may be formed of elastomeric linear members both in the longitudinal and lateral directions. There is no limitation on the types of elastomer that may be used in the unidirectionally stretchable substrate of the present invention, and any elastomer can be selected freely as long as it has stretchability and thermoplasticity. In general, the same material may preferably be used for both longitudinal and lateral directions, but different materials may be used for the longitudinal and lateral directions. Because there is a wide choice of materials from which a selection can be made, the intersections of the linear members can be easily provided with sufficient strength, and the possibility of separation at the intersections can be reduced. Further, the shape retaining characteristics of the meshed material can be further improved because of the non-woven fabric that also functions as a reinforcing member for a meshed material.

A decrease in the permeability of the meshed material can also be minimized due to the small weight per area of the non-woven fabric. In particular, since the filaments of the non-woven fabric are linearly arranged in one direction and are generally uniformly distributed, partial blocking of the openings of the meshed material is not likely to occur. For the same reason, the stretchability of the unidirectionally stretchable substrate of the present invention is barely limited in the direction orthogonal to the direction in which the filaments are arranged. Thus, the stretchability of the unidirectionally stretchable substrate is sufficiently limited in one direction while it is barely lost in the direction orthogonal thereto. This is a preferable characteristic for applications, such as supporters etc., where large stretchability is required for only one direction. Since the filaments of non-woven fabrics are linearly arranged in one direction, a small thickness and good tactile quality can also be obtained.

The unidirectionally stretchable substrate of the present invention has a wide selection of materials because it may be formed as a composite of an elastomeric meshed material and a non-woven fabric made of a thermo plastic resin. For example, the above described EVA net with limited stretchability in one direction generates, in spite of an increase in fusion bonding strength at the intersections, an offensive smell due to EVA when it is put under a high temperature of about 100° C. during thermal compression, during the manufacturing process of the final product (a bonding step, a drying step, etc.) or during use. Thus, such an EVA net cannot be appropriately used for hygienic applications. Moreover, when an olefin material is used in order to obtain limited stretchability in one direction, the unevenness of the net may be directly sensed by the human body due to the hardness of the olefin thus causing the tactile quality to deteriorate. The unidirectionally stretchable substrate of the present invention can be preferably used for hygienic uses because the meshed material is made of elastomer that is softer than olefin and because the olefin will not cause any deterioration in the tactile quality.

Further, the unidirectionally stretchable substrate of the present invention can be supplied at a high feed speed when it is used to fabricate a stretchable composite sheet, as described above. Thus, the production efficiency of stretchable composite sheets is significantly improved.

The invention claimed is:

1. A method of manufacturing a unidirectionally stretchable substrate, comprising:
   manufacturing a non-woven fabric formed of a plurality of continuous filaments made of a thermoplastic resin, wherein the manufacturing step comprises:
   extruding the thermoplastic resin in molten state from a melt blown die toward a conveyor to form the plurality of continuous filaments,
   rotating a gas flow oscillating mechanism in a form of an elliptic column provided between a melt blown die and the conveyer, which is configured to periodically move a falling position of the plurality of continuous filaments on the conveyor backwards and forwards with respect to a transport direction of the conveyor while accumulating the plurality of continuous filaments on the conveyor and to partially fold the continuous filaments on the conveyor in transport direction thereof and a direction opposite to said transportation direction so that the a plurality of continuous filaments are linearly arranged only in those directions, and
   bonding a meshed material to the non-woven fabric, wherein the meshed material comprises a plurality of elastomeric linear members arranged orthogonal to each other, the linear members having stretchability and thermoplasticity, wherein the meshed material is bonded to the non-woven fabric such that a direction in which the continuous filaments of the non-woven fabric are arranged is parallel with one of directions in which the linear members of the meshed material extend.

2. The method of manufacturing a unidirectionally stretchable substrate according to claim 1, wherein the step of bonding comprises;
   bonding the non-woven fabric to the meshed material by thermal compression bonding; and
   crushing the linear members and intersections of the linear members during the thermal compression bonding.

3. A method of manufacturing a stretchable composite sheet, comprising:
   providing the unidirectionally stretchable substrate according to claim 1, and
   laminating a fabric on the unidirectionally stretchable substrate wherein the fabric and the substrate are fed from individual feed rolls such that a direction in which the fabric and the substrate are fed corresponds to a direction in which the continuous filaments of the unidirectionally stretchable substrate are arranged.

4. A method of manufacturing a unidirectionally stretchable substrate according to claim 1, wherein the linear members of the meshed material are made of styrene-based elastomer or urethane-based elastomer.

5. A method of manufacturing a unidirectionally stretchable substrate according to claim 1, wherein the continuous filaments are made of polyethylene terephthalate.

6. A method of manufacturing a unidirectionally stretchable substrate according to claim 1, wherein the non-woven fabric has a weight per area of less than or equal to 10 g/m2, and the meshed material has a weight per area 20 of less than or equal to 50 g/m2.

7. A method of manufacturing a unidirectionally stretchable substrate according to claim 1, wherein the continuous filaments are brought into close contact with two drafting cylinders that are arranged close to each other and the continuous filaments are subject to short distance drafting.

* * * * *